United States Patent [19]

Yoshida et al.

[11] Patent Number: 5,638,514
[45] Date of Patent: Jun. 10, 1997

[54] CENTRALIZED SUPERVISORY SYSTEM FOR SUPERVISING NETWORK EQUIPMENTS BASED ON DATA INDICATING OPERATION STATES THEREOF

[75] Inventors: Kojun Yoshida; Yasuo Fujii; Toshihito Kaneshima, all of Kawasaki, Japan

[73] Assignee: Fujitsu Limited, Kanagawa, Japan

[21] Appl. No.: 114,004

[22] Filed: Aug. 30, 1993

[30] Foreign Application Priority Data

Nov. 20, 1992 [JP] Japan .................................. 4-312483

[51] Int. Cl.⁶ .................................................. G06F 11/00
[52] U.S. Cl. .............. 395/200.11; 395/835; 395/184.01; 371/20.1; 364/242.95; 364/264.7; 364/266; 364/DIG. 1
[58] Field of Search ..................................... 395/800, 725, 395/650, 600, 575, 325, 275, 200, 200.1, 200.11, 835–839, 866, 289, 180, 182.02, 183.01, 183.19, 184.01; 371/8.2, 9.1, 11.1–11.3, 20.1, 29.1, 68.1–68.3; 364/131–133, 138, 514, 550; 370/54, 58.2, 60, 67, 85.1, 85.8, 91, 95.2; 340/825.02, 826, 825.06, 825.08, 825.5

[56] References Cited

U.S. PATENT DOCUMENTS 4,972,367  11/1990  Burke ..................................... 395/275
5,049,873  9/1991  Robins et al. ...................... 340/825.06
5,299,207  3/1994  Fujii ...................................... 371/29.1

Primary Examiner—Eric Coleman
Assistant Examiner—Alpesh M. Shah

[57] ABSTRACT

A centralized supervisory supervises a plurality of network equipments connected to each other by lines based on performance data indicating operation states of the plurality of network equipments. The system includes a central supervisory device, and a medium supervisory system provided between the central supervisory device and the plurality of network equipments. The central supervisory device includes a command output unit for outputting a control command regarding gathering of the performance data, and a status table having state data indicating states of the respective network equipments. The medium supervisory system includes a processing unit for gathering the performance data output from the network equipments in accordance with the control command supplied from the command output unit of the central supervisory device, and a data transmission unit for transmitting to the central supervisory device the performance data gathered by the processing unit, wherein the state data in the status table of the central supervisory device is updated based on the performance data transmitted from the data transmission unit.

9 Claims, 9 Drawing Sheets

CENTRALIZED SUPERVISORY SYSTEM FOR SUPERVISING NETWORK EQUIPMENTS BASED ON DATA INDICATING OPERATION STATES THEREOF

BACKGROUND OF THE INVENTION (1) Field of the invention

The present invention generally relates to a centralized supervisory system for supervising network equipments, and more particularly to a centralized supervisory system capable of effectively confirming that many network equipments are operating normally.

(2) Description of the related art

Recently, in order to effectively carry out the maintenance of many network remote equipments located at different sites, a centralized supervisory system having a central supervisory device for centrally supervising the network equipments has been greatly required, the central supervisory device being located at the nucleus of the system.

A conventional centralized supervisory system for network equipments has a hierarchical structure in which a central supervisory device located at a top thereof gathers performance data and trouble data from a plurality of network equipments communicating with each other in polling operations. The performance data indicates the quality (e.g. a bit error rate) of lines in the network and varies in short intervals (a second order). The trouble data indicates troubles, such as occurrence of a line open state and a power off state, occurring in the respective network equipments and irregularly varies. The performance data and the trouble data output from the respective network equipments are successively sent from supervisory devices in a lower order-layer to supervisory devices in an upper order-layer and are finally gathered into the central supervisory device. The central supervisory device confirms, based on the performance data gathered therein, whether or not the respective network equipments operate normally, and detects troubles suddenly occurring in the network equipments, based on the trouble data.

In a small-scale system having a small number of network equipments, the central supervisory device can gather the performance data output from the respective network equipments without problems. However, in a large-scale system having a large number of network equipments, communication lines and communication processes are occupied by the transmission of a large amount of performance data, so that there is a case where this matter interferes with trouble detecting processes which must be primarily performed. In addition, in a case where supervisory results are recorded in the central supervisory device, a memory for storing the supervisory results becomes full in a short period of time. Further, there is a case where each supervisory device in each layer is provided with a buffering memory for temporarily storing received data in order to compensate for the delay of the process and to compensate for troubles of other supervisory devices. In this case, the buffering memory also becomes full of performance data in a short period of time.

SUMMARY OF THE INVENTION

Accordingly, a general object of the present invention is to provide a novel and useful centralized supervisory system for network equipments in which the disadvantages of the aforementioned prior art are eliminated.

A more specific object of the present invention is to provide a centralized supervisory system for network equipments in which even if there are a large number of network equipments, a time for which the communication lines are occupied by the transmission of the performance data can be decreased.

The above objects of the present invention are achieved by a centralized supervisory system for supervising a plurality of network equipments connected to each other by lines based on performance data indicating operation states of the plurality of network equipments, the system comprising: a central supervisory device; and a medium supervisory system provided between the central supervisory device and the plurality of network equipments. The central supervisory device comprises: command output means for outputting a control command regarding gathering of the performance data; and a status table having state data indicating states of the respective network equipments. The medium supervisory system comprises: data gathering means for gathering the performance data output from the network equipments in accordance with the control command supplied from the command output means of the central supervisory device; and data transmission means for transmitting to the central supervisory device the performance data gathered by the data gathering means, wherein the state data in the status table of the central supervisory device is updated based on the performance data transmitted from the data transmission means.

According to the present invention, only when the control command is output from the central supervisory device, the performance data is gathered into the central supervisory device via the medium supervisory system. Thus, it is possible to decrease a time for which the lines are occupied for transmitting the performance data. As a result, other supervisory operations can be performed without hindrance.

Additional objects, features and advantages of the present invention will become apparent from the following detailed description when read in conjunction with the accompanying drawings.

DESCRIPTION OF THE PREFERRED EMBODIMENTS

Figure 1:
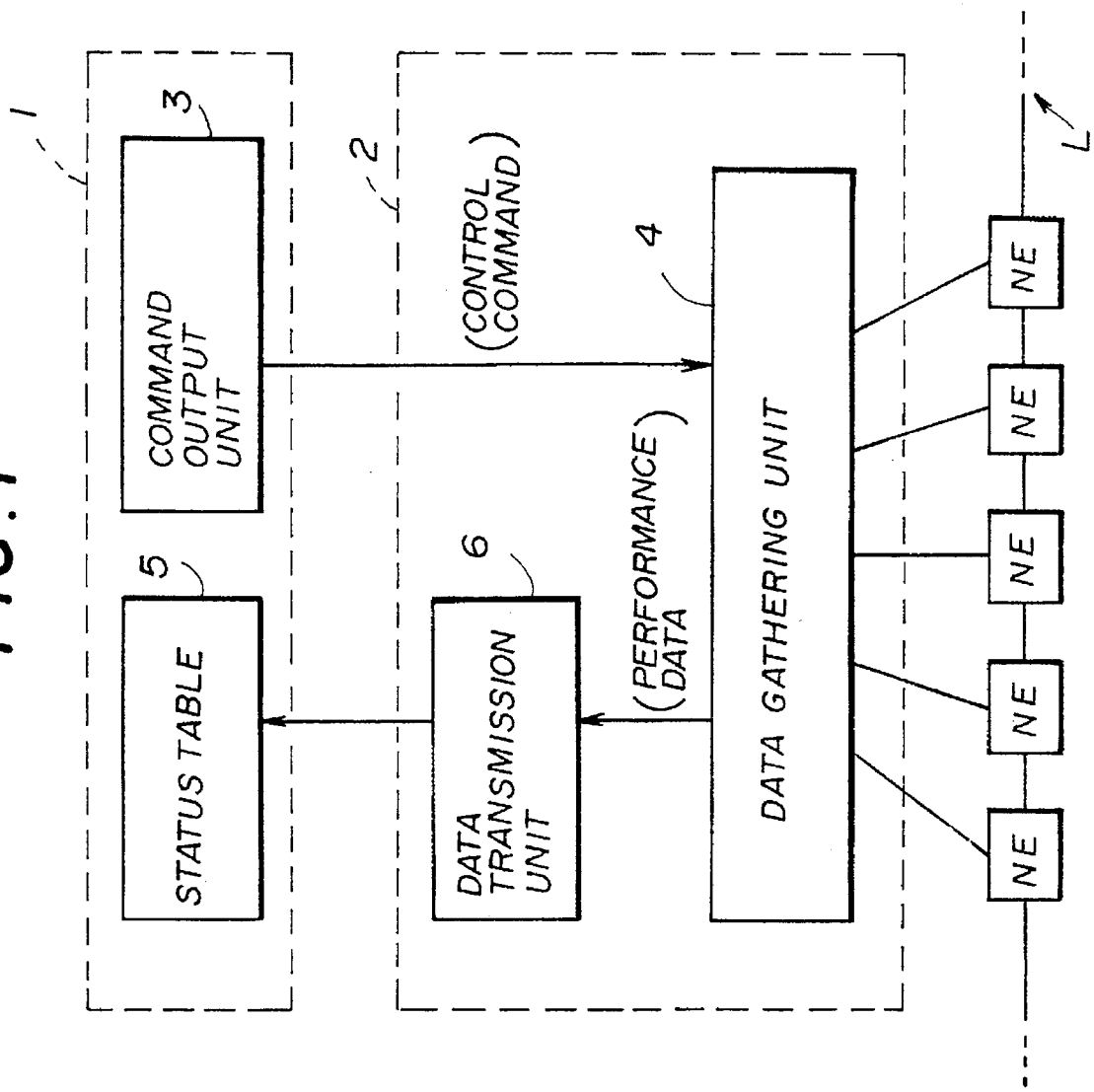
FIG. 1 is a block diagram illustrating the principle of a centralized supervisory system according to the present invention.

A description will be now given, with reference to FIG. 1, of the principle of a centralized supervisory system according to the present invention.

Referring to FIG. 1, a plurality of network equipments (NE) are connected to each other by lines (L). Each of the network equipments (NE) outputs performance data indicating an operating state thereof. A centralized supervisory system for supervising the network equipments has a central supervisory device 1 and a medium supervisory system 2 provided between the central supervisory device 1 and the plurality of network equipments (NE). The central supervisory device 1 includes command output unit 3 for outputting a control command of the gathering of the performance data, and a status table 5 having status data indicating status of the respective network equipments (NE). The medium supervisory system 2 includes data gathering unit 4 for gathering performance data output from the network equipments (NE) in accordance with the control command output from the output unit 3 of the central supervisory device 1, and data transmission unit 6 for transmitting the performance data gathered by the data gathering unit 4 to the central supervisory device 1. In the central supervisory device 1, the status data in the status table 5 is updated based on the performance data supplied from the data transmission unit 6.

In the above centralized supervisory system, the performance data output from the respective network equipments (NE) is usually not supplied to the central supervisory device 1. Only when the command output unit 3 outputs the control command, the performance data output from the respective network equipments (NE) is supplied to the central supervisory device 1 via the medium supervisory system 2.

A description will now given of an embodiment of the present invention.

Figure 2:
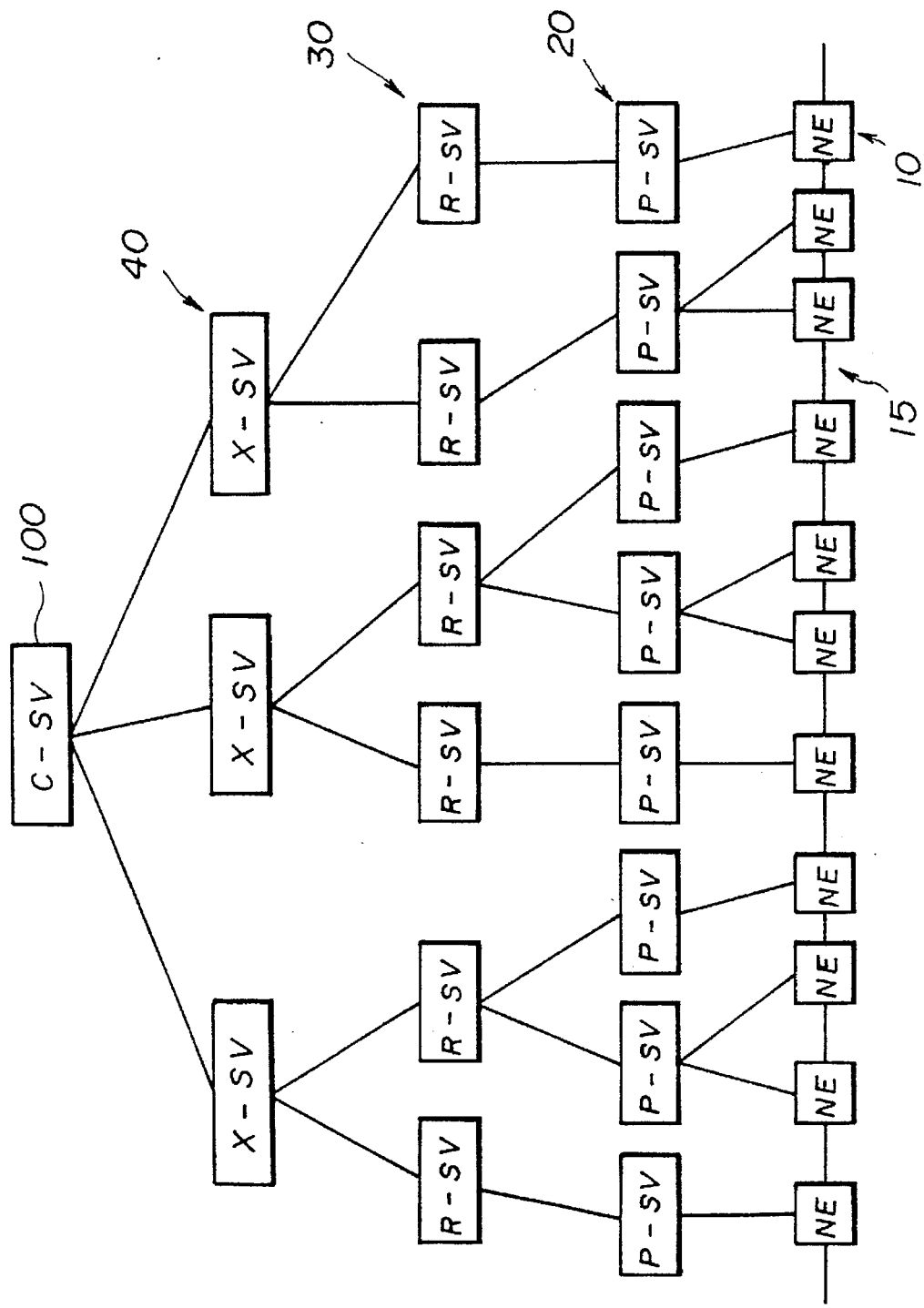
FIG. 2 is a block diagram illustrating a centralized supervisory system according to an embodiment of the present invention.

FIG. 2 shows the structure of a centralized supervisory system according to the embodiment of the present invention.

Figure 3:
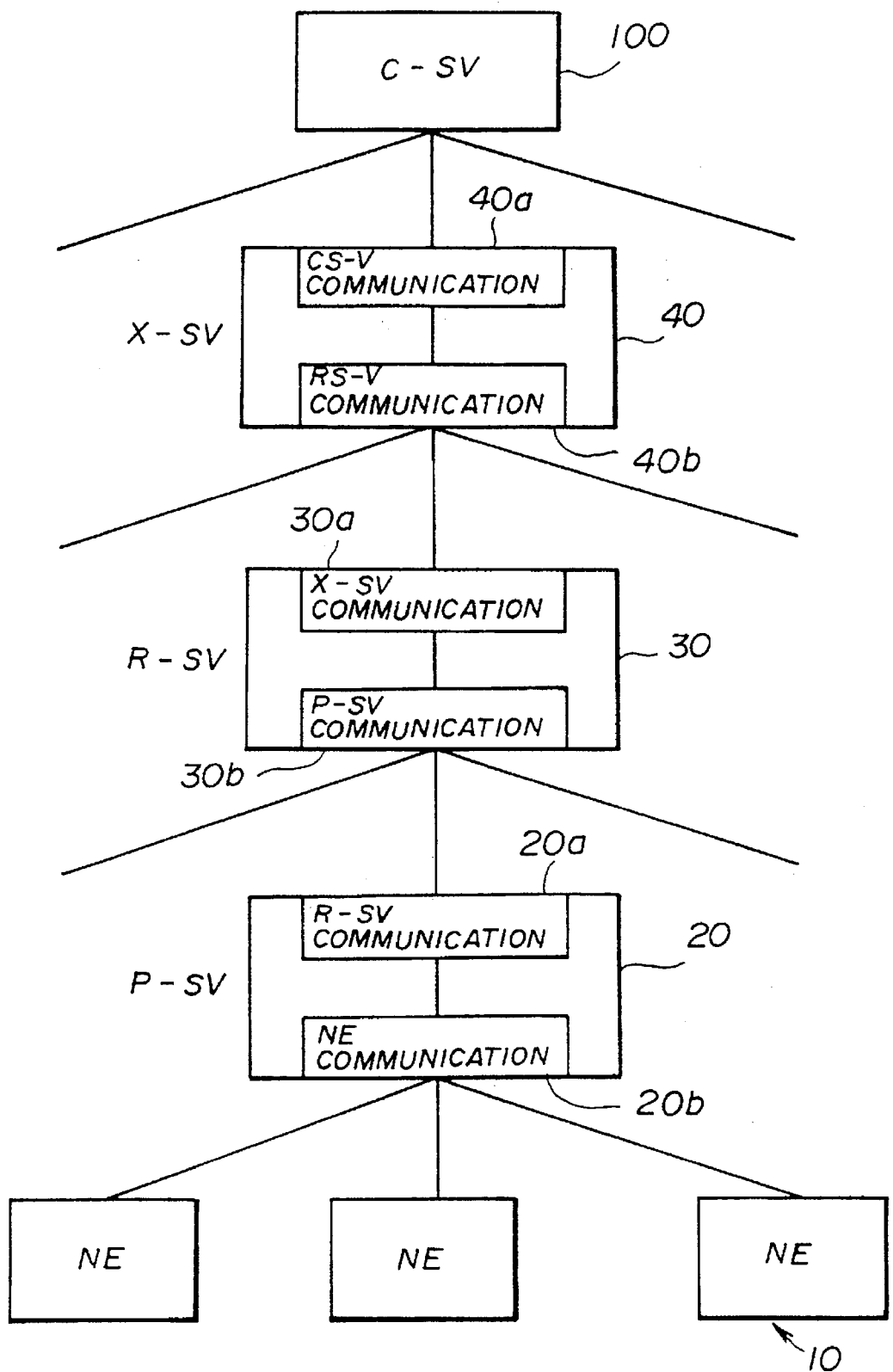
FIG. 3 is a block diagram illustrating an essential structure made up of a primary supervisory device, a regional supervisory device, and an extensive supervisory device.

Referring to FIG. 2, a plurality of network equipments 10 are connected to each other by lines 15, and are communicated with each other. A centralized supervisory system for supervising operations of these network equipments has a hierarchical structure. In a first layer (the lowest layer), primary supervisory devices (P-SV) 20 provided in stations are positioned. Each of the primary supervisory devices (P-SV) 20 is connected to one or a plurality of network equipments 10. In a second layer, regional supervisory devices (R-SV) 30 provided in predetermined regions are positioned. Each of the regional supervisory devices (R-SV) 30 is connected to one or plurality of primary supervisory devices (P-SV) 20 provided in stations located in a corresponding region. In a third layer, extensive supervisory devices (X-SV) 40 provided in zones made up of a plurality of regions are positioned. Each of the extensive supervisory devices (X-SV) 40 is connected to a plurality of regional supervisory devices (R-SV) 30 provided in regions included in a corresponding zone. In the highest layer, a central supervisory device (C-SV) 100 is positioned. The central supervisory device (C-SV) 100 is connected to all the extensive supervisory devices (X-SV) 40. Supervisory devices in the respective layers are formed as shown in FIG. 3. That is, each of the primary supervisory devices (P-SV) 20 has an NE communication portion 20b and an R-SV communication portion 30a, and the performance data and the trouble data output from the network equipments 10 are received by the NE communication portion 20b. Each of the regional supervisory devices (R-SV) 30 has a P-SV communication portion 30b and an X-SV communication portion 30a, and data communication is performed between the P-SV communication portion 30b and the R-SV communication portion 20a of each of the primary supervisory device (P-SV) 20 connected to each of the regional supervisory devices (R-SV) 30. Each of the extensive supervisory devices (X-SV) 40 has an R-SV communication portion 40b and a C-SV communication portion 40a, and data communication is performed between the R-SV communication portion 40b and the X-SV communication portion of each the regional supervisory devices (R-SV) 30 connected to each of the extensive supervisory devices (X-SV) 40. Further, data communication is performed between the C-SV communication portion 40a of each of the extensive supervisory devices (X-SV) 40 and the central supervisory device 100.

The network equipments (NE) 10 are communicated with each other, and generate performance data indicating the status of the lines every time the status (e.g. a bit error rate) of the lines varies. The performance data is usually generated from each of the network equipments (NE) 10 at second order intervals. When a trouble occurs in one of the network equipments (NE) 10, the one of the network equipments (NE) generates trouble data corresponding to the trouble. The NE communication portion 20b of each of the primary supervisory devices (P-SV) 20 receives the performance data and the trouble data output from the network equipments (NE) 10 connected to each of the primary supervisory devices (P-SV) 20. The performance data and the trouble data received by the NE communication portion 20b are stored in an internal memory of a corresponding one of the primary supervisory devices (P-SV) 20.

Figure 4:
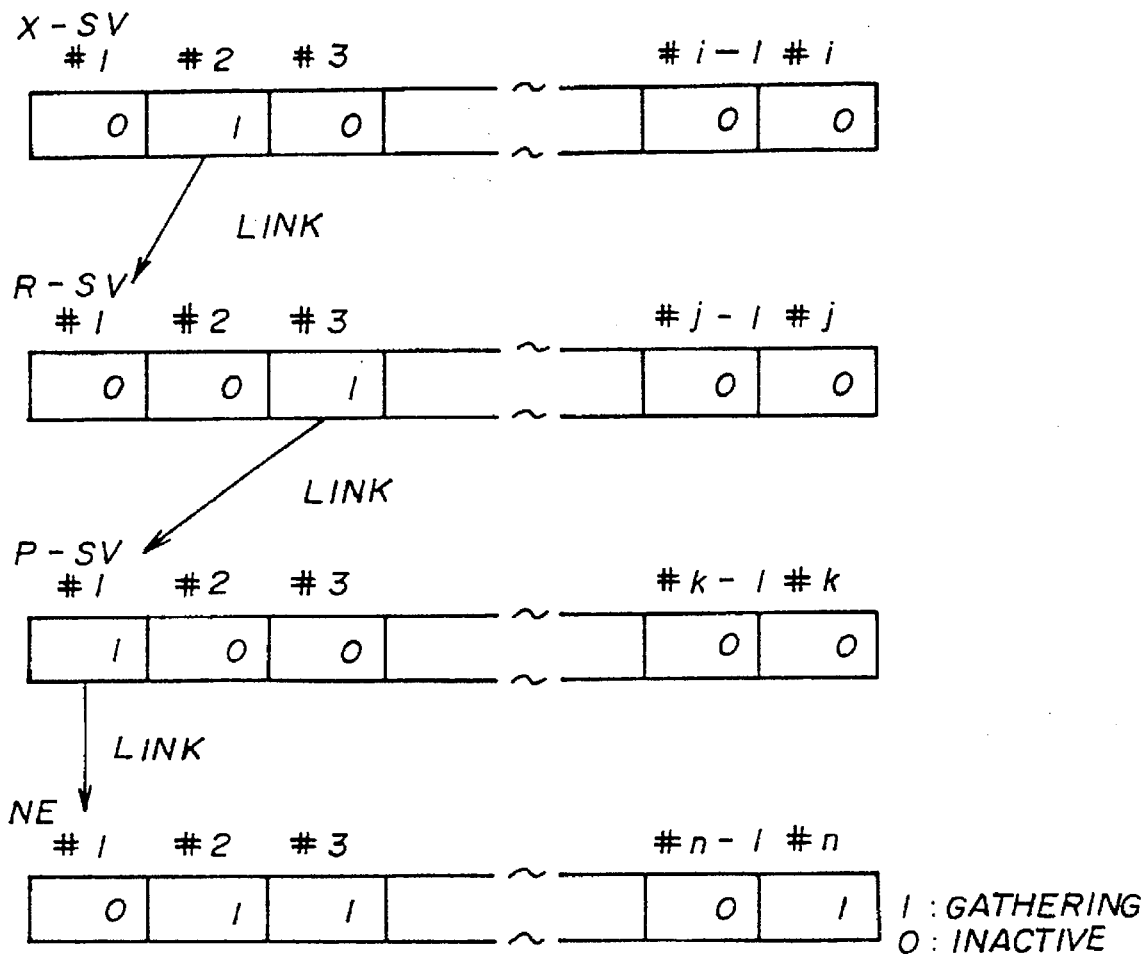
FIG. 4 is a diagram illustrating a performance data supervisory flag table provided in a central supervisory device.

The central supervisory device (C-SV) 100 has an internal memory storing a performance data supervisory flag table, as shown in FIG. 4. The performance data supervisory flag table shown in FIG. 4 includes flags corresponding to addresses (#1-#i) identifying the respective extensive supervisory devices (X-SV) 40, flags corresponding to addresses (#1-#j) identifying the respective regional supervisory devices (R-SV) 30, flags corresponding to addresses (#1-#k) identifying the respective primary supervisory devices (P-SV) 20, and flags corresponding to addresses (#1-#n) identifying the respective network equipments (NE) 10. When an address of a network equipment (NE) 10 from which the performance data is to be gathered is input along with a data gathering command to the central supervisory device (C-SV) 100, flags in the supervisory table are set to "1" such that the network equipment (NE) 10 identified by the input address, and supervisory devices (P-SV, R-SV and X-SV) in respective layers are linked to each other. In the performance data supervisory flag table shown in FIG. 4, flags set to "1" indicate supervisory devices and network equipments all of which are pertinent to the gathering of the performance data, and flags reset to "0" indicate supervisory devices and network equipments all of which are impertinent to the gathering of the performance data.

Figure 5:
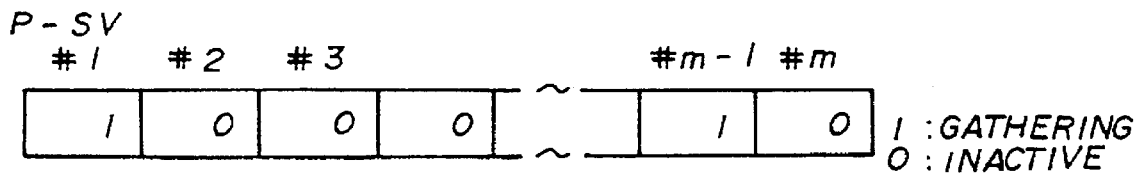
FIG. 5 is a diagram illustrating a supervisory flag table provided in the regional supervisory device.

Each of the regional supervisory devices (R-SV) 30 has an internal memory storing a supervisory flag table (a P-MON flag table) as shown in FIG. 5. This supervisory flag table is provided with flags corresponding to addresses (#1-#m) identifying the primary supervisory devices (P-SV) 20 connected to a corresponding one of the regional supervisory devices (R-SV) 30. In the supervisory flag table shown in FIG. 5, flags set to "1" indicate primary supervisory devices (P-SV) 20 connected to network equipments (NE) from which the performance data is to be gathered, and flags reset to "0" indicate the primary supervisory devices (P-SV) 20 connected to network equipments (NE) 10 from which the performance data is not gathered. In this centralized supervisory system, the duplex management of supervisory operations is performed using the performance data supervisory flag table, shown in FIG. 4, provided in the central supervisory device 100 and the supervisory flag tables, shown in FIG. 5, provided in the respective regional supervisory devices (R-SV) 30.

A description will now be given, in accordance with flow charts shown in FIGS. 6–10, of operations of the centralized supervisory system.

Figure 6:
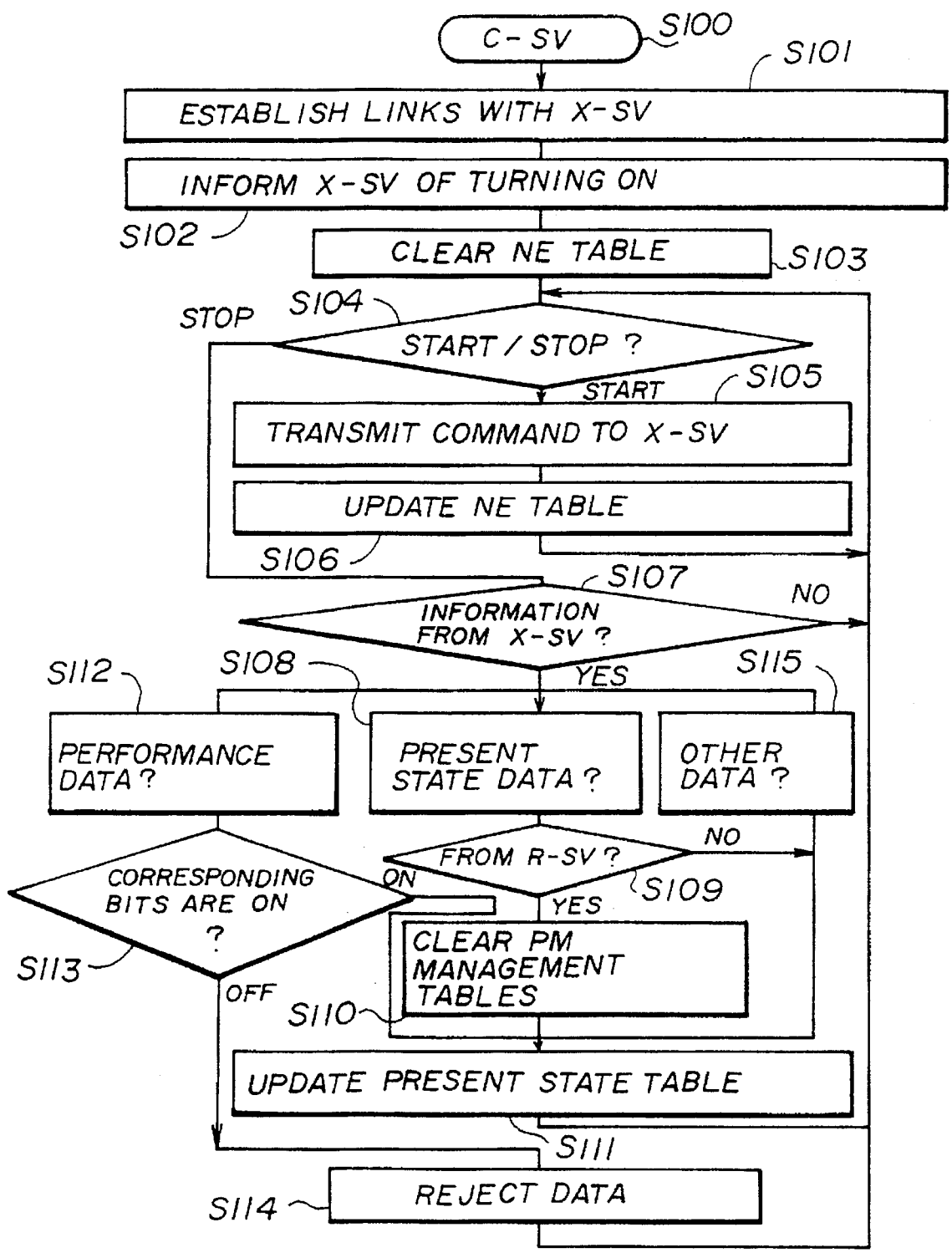
FIG. 6 is a flow chart illustrating an operation of the central supervisory device.
Figure 7:
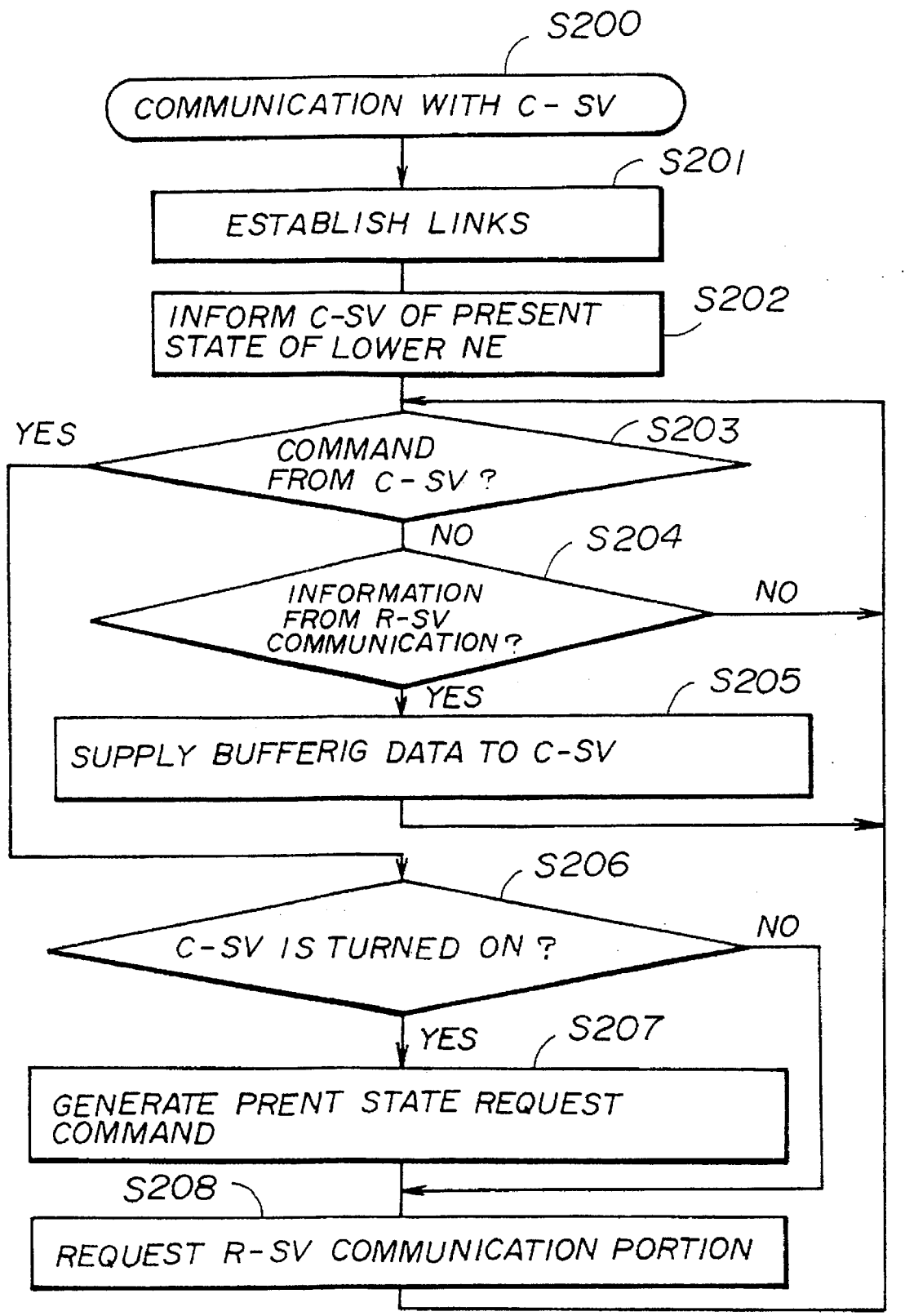
FIG. 7 is a flow chart illustrating an operation of a C-SV communication portion of the extensive supervisory device.
Figure 8:
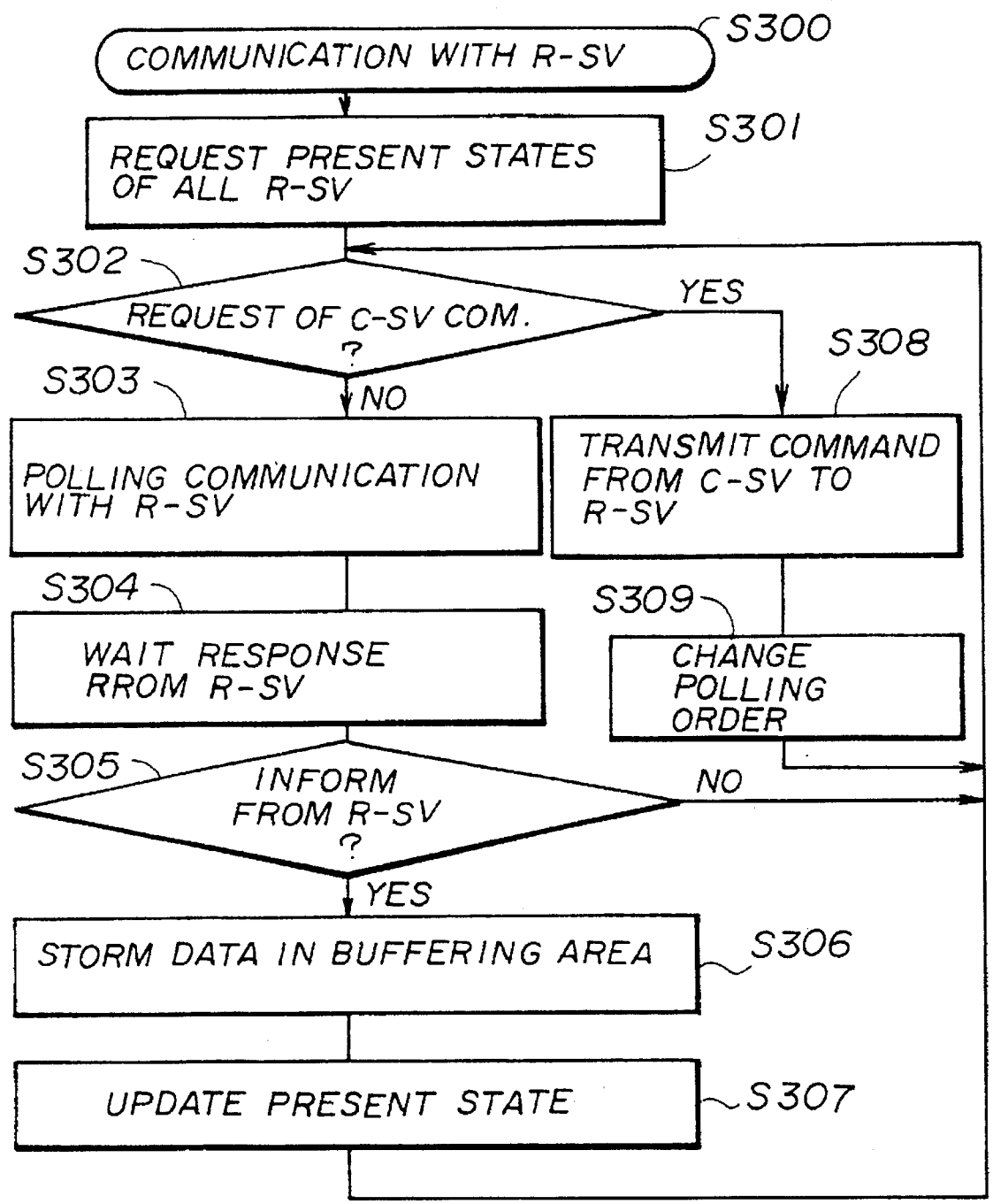
FIG. 8 is a flow chart illustrating an operation of an R-SV communication portion of the extensive supervisory device.
Figure 9:
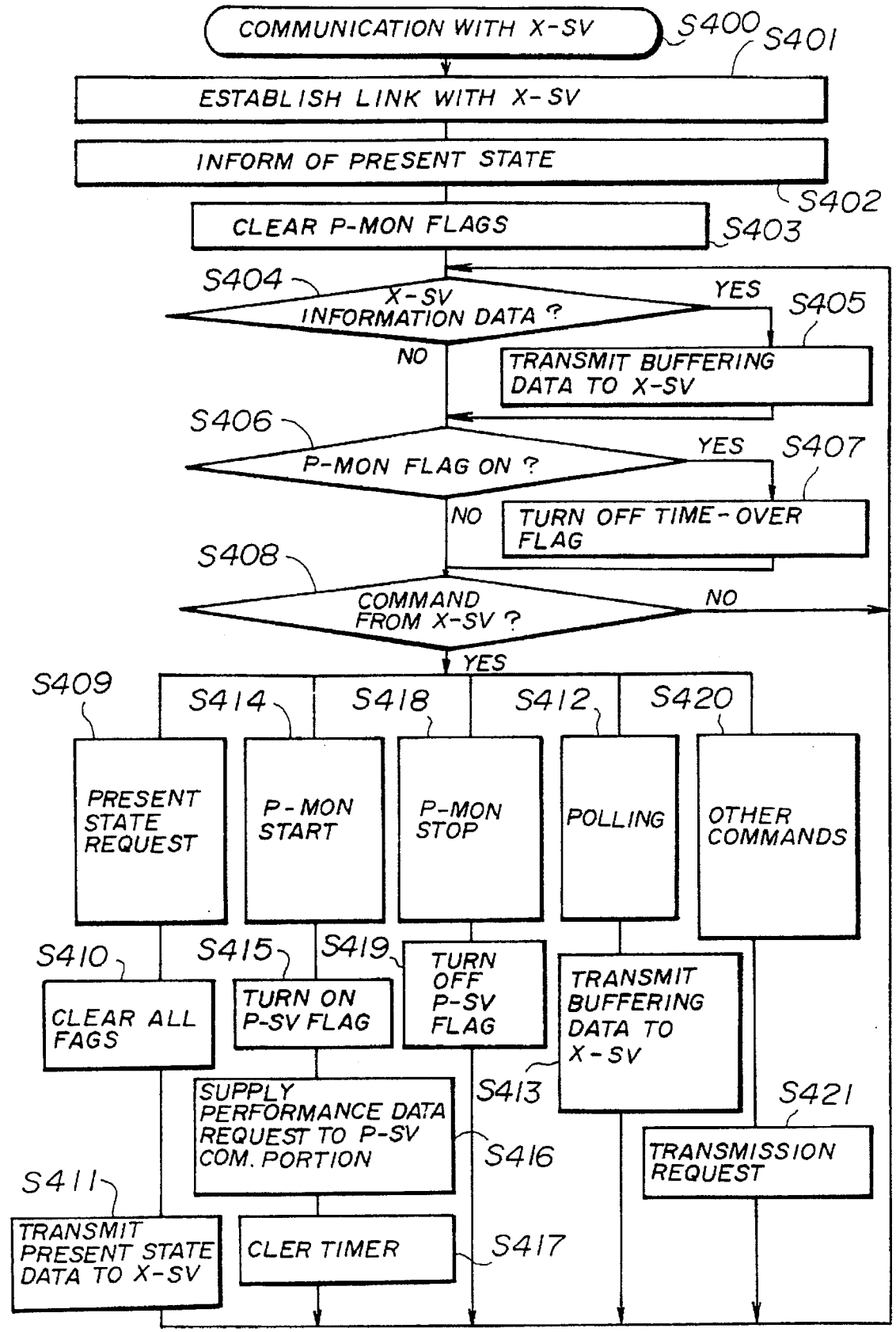
FIG. 9 is a flow chart illustrating an operation of an X-SV communication portion of the regional supervisory device.
Figure 10:
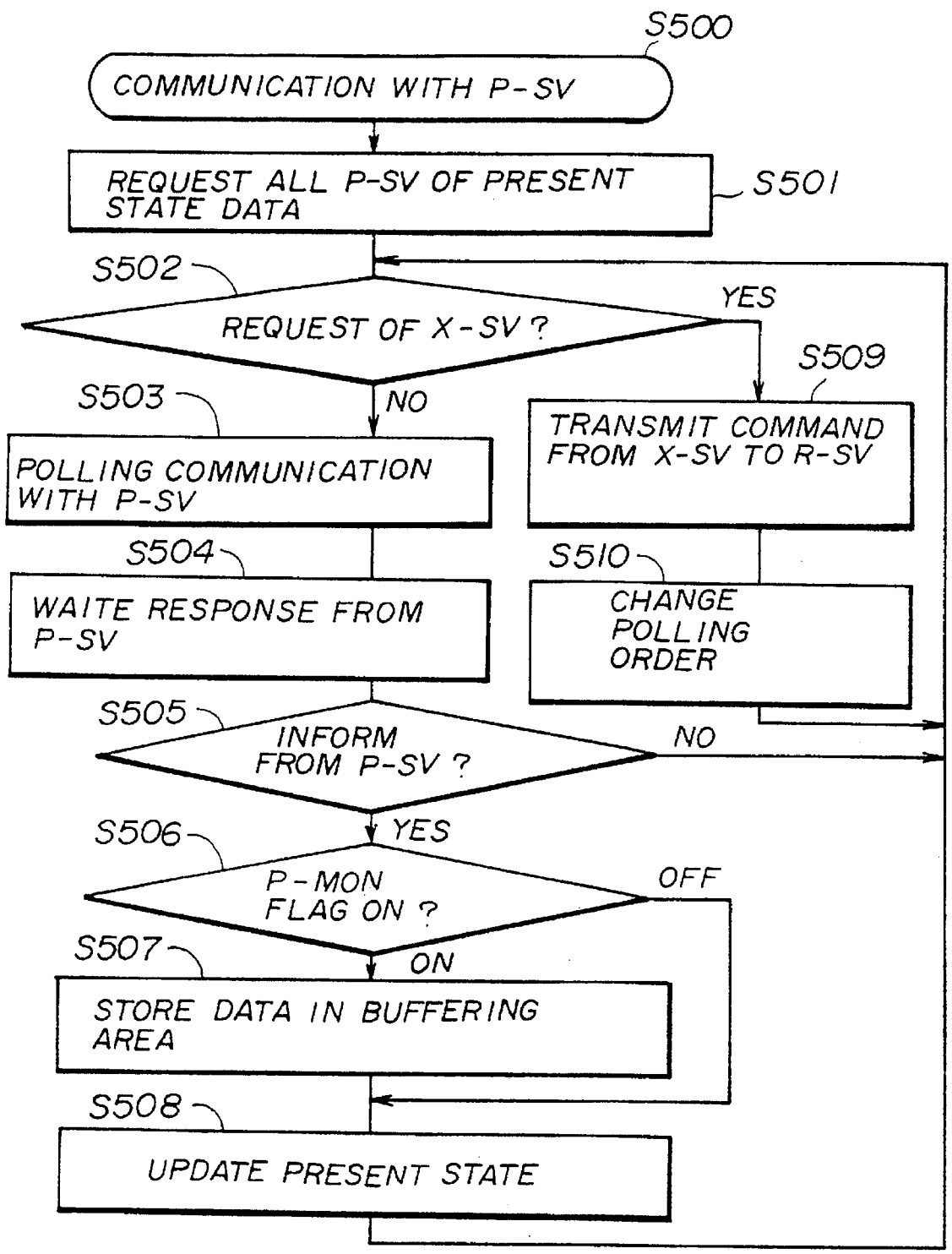
FIG. 10 is a flow chart illustrating an operation of a P-SV communication portion of the regional supervisory device.

FIG. 6 shows a process in the central supervisory device (C-SV) 100, FIG. 7 shows a process in the C-SV communication portion 40a of each of the extensive supervisory devices (X-SV) 40, FIG. 8 shows a process in the R-SV communication portion 40b of each of the extensive supervisory devices (X-SV) 40, FIG. 9 shows a process in the X-SV communication portion 30a of each of the regional supervisory devices (R-SV) 30, and FIG. 10 shows a process in the P-SV communication portion 30b of each of the regional supervisory devices (R-SV) 30.

First, this centralized supervisory system is turned on, and the following process is performed. The process in the center supervisory device (C-SV) 100 starts (S100 in FIG. 6), and links between the central supervisory device (C-SV) 100 and the respective extensive supervisory devices (X-SV) 40 are established (S101). The central supervisory device (C-SV) 100 then informs the respective extensive supervisory devices (X-SV) 40 that the central supervisory device (C-SV) 100 has been turned on (S102). The respective flags in the performance data supervisory flag table shown in FIG. 4 are cleared (S103). After this, the central supervisory device (C-SV) 100 determines whether or not a start/stop control command indicating start or stop of the gathering of the performance data is input to the central supervisory device (C-SV) 100 (S104), and determines whether or not data from the extensive supervisory devices (X-SV) 40 is received (S107). Until the central supervisory device (C-SV) 100 receives either the start/stop control command or the data from the extensive supervisory devices (X-SV) 40, the above steps 104 and 107 are repeated.

When this centralized supervisory system is turned on, the R-SV communication portion 40b of each of the extensive supervisory devices (X-SV) 40 starts communication with the regional supervisory devices (R-SV) 30 connected thereto (S300 in FIG. 8) and requests the regional supervisory devices (R-SV) 30 to supply present state data indicating the present state of the regional supervisory devices (R-SV) 30 (S301). At this time, the P-SV communication portion 30b of each of the regional supervisory devices (R-SV) 30 starts the communication with the primary supervisory devices (P-SV) 20 connected thereto (S500 in FIG. 10), and requests the primary supervisory devices (P-SV) 20 to supply present state data indicating the present state of the primary supervisory devices (P-SV) 20 (S501). In response to the request from each of the regional supervisory devices (R-SV) 30, each of the primary supervisory devices (P-SV) 20 supplies the present state data stored in the internal buffer to a corresponding regional supervisory device (R-SV) 30. The X-SV communication portion 30a then starts the communication with the extensive supervisory device (X-SV) 40 (S400 in FIG. 9), and after a link between the regional supervisory device (R-SV) 30 and the extensive supervisory device (X-SV) 40 is established (S401), the status data supplied from the primary supervisory devices (R-SV) 20 is then transmitted to the extensive supervisory device (X-SV) 40 in the upper layer (S402). The respective flags in the supervisory flag table shown in FIG. 5 are cleared (S403). Further, the C-SV communication portion of each of the extensive supervisory devices (X-SV) 40 starts the communication with the central supervisory device (C-SV) 100 (S200 in FIG. 7), and after a link between each of the extensive supervisory devices (X-SV) 40 and the central supervisory device (C-SV) 100 is established, the present state data (indicating the present state of the network equipments (NE) 10) supplied from the regional supervisory devices (R-SV) 30 in the lower layer is supplied to the central supervisory device (C-SV) 100 (S202).

When the central supervisory device (C-SV) 100 receives the present state data, regarding the network equipments (NE) 10, from the extensive supervisory devices (X-SV) 40 (S107 in FIG. 6), a present state table in the central supervisory device (C-SV) 100 is updated using the present state data supplied thereto (S108, S109 and S111).

As has been described above, when this centralized supervisory system is turned on, the present state data indicating the present state (troubles and/or power off) of the network equipments (NE) 10 is gathered into the central supervisory device (C-SV) 100 via the primary supervisory devices (P-SV) 20, the regional supervisory devices (R-SV) 30 and the extensive supervisory devices (X-SV) 40.

Next, after the system is turned on, a normal supervisory operation is performed as follows.

The respective primary supervisory devices (P-SV) 20 usually gather status data including trouble data from the network equipments (NE) connected thereto. The P-SV communication portion 30b of each of the regional supervisory devices (R-SV) 30 successively performs polling communication with the primary supervisory devices (P-SV) 20 connected thereto, and gathers the status information, of the network equipments (NE) 10, stored in the respective primary supervisory devices (P-SV) 20 (S503, S504 and S505 in FIG. 10). The present state in respective regional supervisory devices (R-SV) is then updated based on the data gathered thereinto (S508). The R-SV communication portion 40b of each of the extensive supervisory devices (X-SV) 40 performs polling communications with the respective regional supervisory devices (R-SV) 30 connected thereto (S303 and S304 in FIG. 8). In the polling communication, the respective regional supervisory devices (R-SV) 30 transmits the data stored in the internal memory to the extensive supervisory device (X-SV) 40 (S408, S412 and S413 in FIG. 9). The R-SV communication portion 40b of each of the extensive supervisory devices (X-SV) 40 stores the data supplied from the respective regional supervisory devices (R-SV) in a buffer area used for communicating with the central supervisory device (C-SV) 100, and the present state is updated based on the data supplied from the respective regional supervisory devices (R-SV) 30 (S305, S306 and S307 in FIG. 8). The C-SV communication portion 40a of each of the extensive supervisory devices (X-SV) 40 transmits the data stored in the above buffer area to the central supervisory device (C-SV) 100 (S204 and S205 in FIG. 7). The central supervisory device (C-SV) 100 which has received the data from the respective extensive supervisory devices (X-SV) 40 updates the present state table based on the received data (S107, S108 and S111 in FIG. 6).

As has been described above, in the normal supervisory operation, the data indicating the state of the network equipments (NE) 10 is gathered into the regional supervisory devices (R-SV) 30 via the primary supervisory devices (P-SV) in the polling communication. The data is further gathered from the regional supervisory devices (R-SV) 30 via the extensive supervisory devices (X-SV) 40 into the central supervisory devices (C-SV) 100. The central supervisory device 100 supervises the state of the network equipments (NE) 10 with reference to the present state table updated based on the data gathered thereinto.

In the above usual supervisory operation, all the cleared flags in the performance data supervisory flag table, shown in FIG. 4, in the central supervisory device (C-SV) 100 and the supervisory flag tables, shown in FIG. 5, in the respective regional supervisory devices (R-SV) 30 are maintained. The performance data output from the respective network equipments (NE) 10 are not gathered into the central supervisory device (C-SV) 100.

The performance data is gathered into the central supervisory device (C-SV) 100, in the usual supervisory operation, as follows.

In the central supervisory device (C-SV) 100, a maintenance stuff carries out operations for inputting addresses identifying network equipments from which the performance data is to be gathered and a start control command. The central supervisory device (C-SV) 100 then transmits the start control command and the addresses identifying the network equipments (NE) 100 to the respective extensive supervisory devices (X-SV) 40 (S104 and S105 in FIG. 6). Flags, corresponding to the addresses identifying the network equipments (NE) 10, in the performance data supervisory flag table (refer to FIG. 4) are set to "1" (S106). When the C-SV communication portion 40a of each of the extensive supervisory devices (X-SV) 40 receives the start control command and the addresses of the network equipments (NE) (S203 and S206 in FIG. 7), the R-SV communication portion 40b receives transmission request with respect to the start control command and the addresses of the network equipments (NE) 10. The R-SV communication portion 40b of each of the extensive supervisory devices (X-SV) 40 then transmits, in response to the transmission request (S302 in FIG. 8), the start control command and the addresses of the network equipments (NE) 10 to the regional supervisory devices (R-SV) 30 connected thereto (S308). When the X-SV communication portion 30a of each of the regional supervisory devices (R-SV) 30 receives the start control command and the address of the network equipments (NE) 10 transmitted from the extensive supervisory devices (X-SV) 40 (S408 and S414 in FIG. 9), flags, corresponding to the address received thereby, in the supervisory flag table shown in FIG. 5 are set to "1" (S415). At this time, the supervisory flag tables in the respective regional supervisory devices (R-SV) 30 and the performance data supervisory flag table in the central supervisory device 100 have the same condition as each other. After the flags in the supervisory flag table is set to "1", the X-SV communication portion 30a of each of the regional supervisory devices (R-SV) 30 supplies performance data request to the P-SV communication portion 30b (S416), and timers corresponding to the respective network equipments (NE) 10 are initialized (S417). The timers are then activated.

When the P-SV communication portion 30b of each of the regional supervisory devices (R-SV) 30 receives the performance data request (S502 in FIG. 10), the P-SV communication portion 30b transmits the start command to the primary supervisory devices (P-SV) 20 connected thereto. Here, the P-SV communication portion 30b changes the polling order so that the primary supervisory devices (P-SV) 20 connected to the network equipments (NE) 10 from which the performance data are prior to others in the polling order (S510). The P-SV communication portion 30b performs the polling communication with the primary supervisory devices in accordance with the changed polling order (S503, S504 AND S505). The respective network equipments (NE) 10 usually output the performance data indicating operating states (a bit error rate etc.) thereof, the respective primary supervisory devices (P-SV) 20 gathers the performance data along with the status data described above every time the operating state is changed (e.g. at 1 second intervals). The P-SV communication portion 30b of each of the regional supervisory devices (R-SV) 30 receives the performance data, gathered into the first supervisory devices with which the polling communication is performed, along with the usual data (S505). The present state in each of the regional supervisory devices (R-SV) 30 is updated based on the data received thereby. With reference to the supervisory flag table, the performance data and the usual data supplied from the primary supervisory devices (P-SV) 20 corresponding to the flags set to "1" are stored in a buffer area used for the communication with the extensive supervisory devices (X-SV) 40 (S507). As has been described above, the respective regional supervisory devices 30 supervise the gathering of the performance data from each of the primary supervisory devices (P-SV) 20.

In addition, the R-SV communication portion 40b of each of the extensive supervisory devices (X-SV) 40 changes the polling order so that the regional supervisory devices (R-SV) 30 corresponding to the network equipments (NE) from which the performance data is to be gathered are prior to others in the polling order (S309 in FIG. 8). The R-SV communication portion 40b then performs the polling communication with the regional supervisory devices (R-SV) 30 in accordance with the changed polling order (S303 and S304). In the polling communication, the X-SV communication portion 30a of each of the regional supervisory devices (R-SV) 30 transmits the performance data stored in the buffer area to the extensive supervisory devices (X-SV) 40 (S408. S412, and S413 in FIG. 9). The R-SV communication portion 40b of each of the extensive supervisory devices (X-SV) 40 stores the performance data supplied from the respective regional supervisory devices (R-SV) 30 and the usual data in a buffer area used for communication with the central supervisory device (C-SV) 100, and the present state therein is updated based on the data stored in the buffer area (S305, S306 and S307 in FIG. 8). The performance data stored in the buffer area is transmitted from the extensive supervisory devices (X-SV) to the central supervisory device (C-SV) 100 in the same manner as the usual data. The respective regional supervisory devices (R-SV) 30 gathers the performance data of the network equipments (NE) 10 from respective ones of the primary supervisory devices (P-SV) 20 as has been described above. In this case, there is a case where items of the performance data received by the central supervisory device (C-SV) 100 include items of the performance data generated by the network equipments (NE) 10 which have not been identified by the input addresses. Thus, the central supervisory device (C-SV) 100 rejects the items of the performance data generated by the network equipments (NE) 10 corresponding to flags reset to "0" in the performance data supervisory flag table (S107, S112 and S113 in FIG. 6). The present state table in the central supervisory device (C-SV) 100 is updated based on both the performance data of the network equipments corresponding to the flags set to "1" and the usual data (S113, S115 and S111 in FIG. 6).

As has been described above, the performance data output from only the network equipments (NE) identified by the input address is gathered into the central supervisory device (C-SV) 100. The maintenance worker recognizes the operating state of the network equipments identified by the input addresses based on the performance data gathered into the central supervisory device (C-SV) 100.

To stop the above gathering operation of the performance data, the maintenance worker inputs to the central supervisory device (C-SV) 100 a stop control command and addresses identifying the network equipments (NE) 10 corresponding to which the gathering of the performance data is to be stopped (S104 in FIG. 6). The stop control command and the addresses are then supplied to the respective regional supervisory devices (R-SV) via the extensive supervisory devices (X-SV) 40 (S105, S206, S208 and S308) The respective regional supervisory devices (R-SV) receiving the stop command resets the flags, in the supervisory flag table, corresponding to the primary supervisory devices (P-SV) 20 connected to the network equipments(NE) 10 corresponding to which the gathering of the performance data is to be stopped (S408, S418 and S419 in FIG. 9). As a result, gathering of the performance data from the network equipments (NE) 10 corresponding to the flags reset to "0" is interrupted (S506 and S507 in FIG. 10). In addition, in the central supervisory device (C-SV) 100, the performance data supervisory flag table is updated based on the address, input thereto, identifying the network equipments (NE) 10 corresponding to which the gathering of the performance data is to be stopped (S106 in FIG. 6).

When each of the timers which have been activated (S417) in response to the start control command reaches to a predetermined time (e.g. 24 hours), a flag indicating a network equipment (NE) 10 corresponding to each of the timers which have reached the predetermined time is reset to "0". As a result, gathering of the performance data from the network equipments (NE) corresponding to the timers which have reached the predetermined time is interrupted. Thus, even if the maintenance worker forgets to input the stop control command to the central supervisory device (C-SV) 100, an unavailing process is not continued.

When the central supervisory device (C-SV) 100 is restarted after temporarily being stopped in the supervisory operation, the performance data supervisory table is cleared (S103). In this case, the present state request command is generated by the respective extensive supervisory devices (X-SV) 40 based on a command supplied from the central supervisory device (C-SV) 100 (S206 and S207), and is transmitted to the regional supervisory devices (R-SV) 30 connected thereto. When the respective regional supervisory devices (R-SV) 30 receive the present state request, the supervisory flag tables are cleared and the present state data is transmitted to the extensive supervisory devices (X-SV) 40 (S408, S409, S410 and S411). The present state data is further transmitted to the central supervisory device (C-SV) 100. When a regional supervisory device (R-SV) is restarted after being temporarily stopped in the supervisory operation, the supervisory flag table in the regional supervisory device (R-SV) is cleared, and the present state data is transmitted to the extensive supervisory device (X-SV) 40 (S401, S402 and S403). In this case, when the central supervisory device (C-SV) 100 receives the present state data supplied from the regional supervisory device (R-SV) 30 via the extensive supervisory device (X-SV) 40, the central supervisory device 100 resets flags, in the performance data supervisory flag table, related to the regional supervisory device (R-SV) in which the supervisory flag table has been cleared (S107, S108, S109 and S110). The present state table in the central supervisory device (C-SV) is then updated based on the present state data received thereby.

According to the above processes, the performance data supervisory flag table in the central supervisory device (C-SV) 100 and the supervisory flag tables in the respective regional supervisory devices (R-SV) 30 usually have the same condition. Thus, even if the duplex management is performed with respect to the gathering of the performance data by the central supervisory device (C-SV) 100 and the respective regional supervisory devices (R-SV) 30, the duplex management is usually not in a contradictory condition.

The present invention is not limited to the aforementioned embodiments, and variations and modifications may be made without departing from the scope of the claimed invention.

What is claimed is:

1. A centralized supervisory system for supervising a plurality of network equipments connected to each other by lines based on performance data indicating operation states of said plurality of network equipments, said system comprising:

a central supervisory device; and
a medium supervisory system provided between the central supervisory device and said plurality of network equipments,
said central supervisory device comprising:
command output means for outputting a control command regarding gathering of the performance data, and
a status table having state data indicating states of the respective network equipments;
said medium supervisory system comprising:
data gathering means for gathering the performance data output from said network equipments in accordance with the control command supplied from the command output means of said central supervisory device, and
data transmission means for transmitting to said central supervisory device the performance data gathered by the data gathering means, wherein the state data in said status table of said central supervisory device is updated based on the performance data transmitted from said data transmission means,
wherein the control output from said command output means of said central supervisory device includes identification information identifying network equipments from which the performance data is to be gathered, and wherein said data gathering means of said medium supervisory system gathers at least the performance data output from the network equipments identified by said identification information included in said control command.

2. The system as claimed in claim 1, wherein the data gathering means of said central supervisory device has data storage means for storing the performance data output from all of said network equipments, and selecting means for selecting at least performance data output from said network equipments identified by the identification information from among the performance data stored in said data storage means.

3. The system as claimed in claim 1, wherein said central supervisory device further comprises:
first data rejecting means for excepting performance data other than the performance data output from the network equipments identified by the identification information from data to be used for updating the state data in said status table.

4. The system claimed in claim 3, wherein said central supervisory device further comprises:

a first flag table indicating the network equipment from which the performance data is to be gathered, said first flag table being updated in accordance with the identification information included in the control command, wherein said medium supervisory system further comprises:

a second flag table for indicating the network equipments from which said data gathering means should actually gather the performance data, said second flag table being made based on the identification information included in the control command, and wherein said rejecting means of said central supervisory device excepts the performance data, with reference to said first flag table, from the data to be used for updating the state information, with reference to said first flag table, and said data gathering means gathers the performance data with reference to said second flag table.

5. The system as claimed in claim 4, wherein said medium supervisory system further comprises:

means for resetting flags of said second flag table when flags of said first flag table in said central supervisory device are reset.

6. The system as claimed in claim 4, wherein said central supervisory device further comprises:

means for resetting flags of said first flag table when corresponding flags of said second flag table in said medium supervisory system are reset.

7. The system as claimed in claim 1, wherein the command output means of said central supervisory device is capable of outputting a start command based on a start operation of an operator and a stop command based on a stop operation of the operator, and wherein said medium supervisory system has first control means for causing said data gathering means to start to gather the performance data in accordance with the start command output from said command output means, and second control means for causing said data gathering means to stop gathering the performance data in accordance with the stop command output from said command output means.

8. The system as claimed in claim 7, wherein said medium supervisory system further comprises:

timer means for counting a time, said timer being activated when the start command is supplied; and means for compulsorily causing said data gathering means to stop the gathering of the performance data when a count time of said timer means reaches a predetermined value.

9. The system as claimed in claim 1, wherein said medium supervisory system supervises the network equipments in accordance with an order in a polling operation, and wherein said medium supervisory system has order changing means for changing the order in the polling operation so that the network equipments identified by the identification information are prior to others in the order, said data gathering means gathering the performance data from the network equipments in the order obtained by said order changing means in the polling operation.

* * * * *